(12) United States Patent
Zhang et al.

(10) Patent No.: US 9,070,410 B2
(45) Date of Patent: Jun. 30, 2015

(54) RECORDING MEDIA, DATA STORAGE DEVICES, AND METHODS FOR DETERMINING A POSITION ERROR SIGNAL IN A RECORDING MEDIUM

(71) Applicant: MARVELL INTERNATIONAL LTD., Hamilton (BM)

(72) Inventors: Jingliang Zhang, Singapore (SG); Anmin Kong, Singapore (SG); Songhua Zhang, Singapore (SG); Zhimin Yuan, Singapore (SG); Linlin Thi, Singapore (SG)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 13/946,988

(22) Filed: Jul. 19, 2013

(65) Prior Publication Data

US 2014/0204486 A1 Jul. 24, 2014

Related U.S. Application Data

(60) Provisional application No. 61/673,759, filed on Jul. 20, 2012, provisional application No. 61/673,764, filed on Jul. 20, 2012.

(51) Int. Cl.
| | |
|---|---|
| *G11B 5/02* | (2006.01) |
| *G11B 23/00* | (2006.01) |
| *G11B 20/12* | (2006.01) |
| *G11B 5/596* | (2006.01) |
| *G11B 27/10* | (2006.01) |
| *G11B 27/30* | (2006.01) |

(52) U.S. Cl.
CPC ........ *G11B 20/1217* (2013.01); *G11B 5/59627* (2013.01); *G11B 5/59655* (2013.01); *G11B 27/105* (2013.01); *G11B 27/3027* (2013.01)

(58) Field of Classification Search
None
See application file for complete search history.

(56) References Cited

U.S. PATENT DOCUMENTS

| | | | |
|---|---|---|---|
| 3,404,392 A | 10/1968 | Sordello | |
| 3,864,740 A | 2/1975 | Sordello et al. | |
| 4,048,660 A * | 9/1977 | Dennison et al. | 360/77.08 |
| 4,286,296 A * | 8/1981 | Cunningham | 360/77.11 |
| 4,488,188 A | 12/1984 | Hansen et al. | |

(Continued)

OTHER PUBLICATIONS

Search Report issued by the Danish Patent and Trademark Office for corresponding Singapore Patent Application No. 201305561-1, 8 pages, (Sep. 26, 2014).

(Continued)

*Primary Examiner* — Thang Tran

(57) ABSTRACT

According to various embodiments, a recording medium may be provided. The recording medium may include a dedicated servo layer configured to provide servo information. The dedicated servo layer may include a plurality of tracks. A first track may include a first servo signal. The first servo signal may include first servo bursts of a pre-determined frequency. A second track adjacent to the first track may include a second servo signal. The second servo signal may include second servo bursts of the pre-determined frequency.

17 Claims, 13 Drawing Sheets

(56) References Cited

U.S. PATENT DOCUMENTS

| | | | |
|---|---|---|---|
| 4,490,756 A | | 12/1984 | Dost et al. |
| 4,910,617 A | | 3/1990 | Brunnett et al. |
| 5,095,471 A | | 3/1992 | Sidman |
| 5,777,816 A | | 7/1998 | Hampshire et al. |
| 5,912,778 A | | 6/1999 | Kalfs et al. |
| 6,122,117 A | * | 9/2000 | Aikawa ............... 360/46 |
| 6,574,068 B1 | * | 6/2003 | Hampshire et al. ....... 360/77.08 |
| 6,614,608 B1 | * | 9/2003 | Belser et al. ............ 360/48 |
| 6,873,482 B1 | | 3/2005 | Hsieh et al. |
| 2005/0141123 A1 | | 6/2005 | Roth |

OTHER PUBLICATIONS

Written Opinion issued by the Danish Patent and Trademark Office for corresponding Singapore Patent Application No. 201305561-1, 11 pages, (Sep. 26, 2014).

* cited by examiner

RECORDING MEDIA, DATA STORAGE DEVICES, AND METHODS FOR DETERMINING A POSITION ERROR SIGNAL IN A RECORDING MEDIUM

CROSS-REFERENCE TO RELATED APPLICATIONS

The present application claims the benefit of the U.S. provisional patent application No. 61/673,759 filed on 20 Jul. 2012 and of the U.S. provisional patent application No. 61/673,764 filed on 20 Jul. 2012, the entire contents of which are incorporated herein by reference for all purposes.

TECHNICAL FIELD

Embodiments relate generally to recording media, data storage devices, and methods for determining a position error signal in a recording medium.

BACKGROUND

Electronic devices, including mobile computing and/or communication devices, are becoming smaller thereby driving the weight and size of data storage devices down, while requiring large storage capacity in the terabyte range and low power consumption. An increasing storage capacity would require the need for increased precision in tracking the movement of the read/write head.

Data storage devices, for example hard disk drives (HDDs), employ servo systems for tracking and controlling the movement of the read/write head. Conventional servo systems may employ embedded servo where the servo information runs radially across the tracks from the inner diameter (ID) to the outer diameter (OD) of the disk in a series of "servo wedges" with data. Therefore, the servo information is only detected when the read/write head moves over these servo wedges. In between the servo wedges, no servo information is received by the head.

Data storage devices also employ dedicated servo, e.g. as shown in FIG. 1, where the servo information is provided on a servo layer 104 distinct from the data recording layer 102 (in other words: data layer 102).

SUMMARY

According to various embodiments, a recording medium may be provided. The recording medium may include a dedicated servo layer configured to provide servo information. The dedicated servo layer may include a plurality of tracks. A first track may include a first servo signal. The first servo signal may include first servo bursts of a pre-determined frequency. A second track adjacent to the first track may include a second servo signal. The second servo signal may include second servo bursts of the pre-determined frequency.

According to various embodiments, a data storage device may be provided. The data storage device may include a recording medium according to various embodiments.

According to various embodiments, a method for determining a position error signal in a recording medium may be provided. The recording medium may include: a dedicated servo layer configured to provide servo information. The dedicated servo layer may include a plurality of tracks. A first track may include a first servo signal. The first servo signal may include first servo bursts of a pre-determined frequency. A second track adjacent to the first track may include a second servo signal. The second servo signal may include second servo bursts of the pre-determined frequency. The method may include: reading a signal from the recording medium; and determining a position error signal based on the read signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 145 shows a diagram illustrating a cross-correlation of a servo raw signal with a 50 MHz sinusoid;

DESCRIPTION

Figure 1:
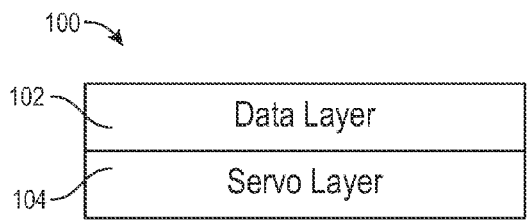
FIG. 1 shows a dedicated servo system.

Embodiments described below in context of the devices are analogously valid for the respective methods, and vice versa. Furthermore, it will be understood that the embodiments described below may be combined, for example, a part of one embodiment may be combined with a part of another embodiment.

In this context, the data storage device as described in this description may include a memory which is for example used in the processing carried out in the data storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hardwired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Electronic devices, including mobile computing and/or communication devices, are becoming smaller thereby driving the weight and size of data storage devices down, while requiring large storage capacity in the terabyte range and low power consumption. An increasing storage capacity would require the need for increased precision in tracking the movement of the read/write head.

In hard disk drives, a servo system may be very important. It may control the moving of the read/write head on the disk. It may use servo patterns to position the read/write head on the center of the track to read and write user data. In commonly used hard disk drives, servo information may be recorded in servo wedges. The performance of tracking systems may be limited by the servo sampling rate. The higher the servo sampling rate the better the tracking performance. The sampling frequency of the servo system may be limited by the number of servo wedges in one revolution and the rotating speed of the disk.

Data storage devices, for example hard disk drives (HDDs), employ servo systems for tracking and controlling the movement of the read/write head. Conventional servo systems may employ embedded servo where the servo information runs radially across the tracks from the inner diameter (ID) to the outer diameter (OD) of the disk in a series of "servo wedges" interspersed with data. Therefore, the servo information is only detected when the read/write head moves over these servo wedges. In between the servo wedges, no servo information is received by the head.

To improve the tracking accuracy, the number of servo wedges may be desired to be increased. However, increase the number of servo wedges may reduce the number of data sector for user data, and thus may reduce the capacity of the hard disk drive. A dedicated servo system may combat this problem.

HCl. 1 shows a dedicated servo system 100. For example in a data storage device with the dedicated servo system 100, dedicated servo may be employed, where the servo information is provided on a servo layer 104 distinct from the data recording layer 102 (in other words: data layer 102).

In a dedicated servo implementation, one disk surface (servo layer) is dedicated to store the position data referred to as servo data or servo signal. The servo layer may be a buried layer arranged beneath the data recording layer and may have a perpendicular or a longitudinal magnetization orientation for providing magnetic information for determining the location of the head in relation to the storage medium. The servo information is provided on the servo layer distinct from the data recording layer so as to allow continuously available servo readback to enable continual position feedback thereby providing continual position detection without utilizing any of the recording layer for position detection. This may provide higher positioning accuracy through continual location determination, while also removing the servo sectors/tracks from the recording layer, thereby increasing surface utilization of the storage space in the recording layer and further increasing the data recording track density by increasing the track positioning accuracy. Further, the servo layer and data layer may be put on the same side and they may be read and/or processed together; this may also be referred to as dedicated servo.

The dedicated servo layer may have a continuous track structure having a plurality of servo tracks in a concentric arrangement.

In the dedicated servo system 100, a magnetic disk with two magnetic layers 102 and 104 may be used. The top layer 102 (the data layer) may have less spacing loss, and may be used to record user data. The bottom layer 104 (the servo layer) may be used to record servo pattern because servo layer may support low linear density.

In the dedicated servo system, data and servo may be written at different layers. The top layer 102 may have a high linear density and may be used to write user data. The bottom layer 104 may have a low linear density and may be used to write servo pattern. The dedicated servo system may provide continuous PES (position error signal) information and thus may improve the servo performance.

In dedicated servo systems, servo and data are written at different layers. In one example, dual-frequency servo bursts may be written on the servo layer to provide continuous positioning error signal (PES). A single tone servo signal $f_1$ may be written at one track and another single tone signal $f_2$ may be written at adjacent track. The signal amplitude of $f_1$ and $f_2$ may be estimated as A and B, respectively. The ratio of $(A-B)/(A+B)$ may be used as the positioning error signal (PES) for the servo. The dedicated servo system may provide continuous PES signal and thus can improve the servo performance.

Dual-frequency servo systems may provide continuous PES and thus may improve servo performance in HDD. Dual-frequency servo systems may use two different single tones $f_1$ and $f_2$ (in other words: on each two neighboring tracks of the servo layer, one track has a signal of a first frequency, and another track has a signal of a second frequency, and tracks with the first frequency and the second frequency are provided alternatingly) to generate the continuous positioning error signal (PES). However, the performance of the dual-frequency servo may be degraded due to the coupling of data signal to the servo. Simulation may show that the performance of the RRO (repeatable runout) may be affected by a 90 Hz harmonic (for RPM (rotations per minute) 7200 drive, the harmonic may be 120 Hz). This harmonic may be caused by the repeat of the coupled data.

In the dedicated servo system, interference from data layer may be a big problem to PES demodulation. It may affect the quality of PES signal by inducing significant repeatable interference components in the PES demodulation, which may significantly affect the servo tracking performance.

The performance of the dual-frequency system may be affected by the interference from data layer. In order to read back data correctly, the signal at the data layer may be stronger than servo signal. This may cause a serious interference to servo and thus reduce the servo performance. In 5400 RPM drive, a 90 Hz harmonic (for 7200 RPM drive, the harmonic is 120 Hz) may be observed in Repeatable Run-Out (RRO). This harmonic may be caused by the repeat of the coupled data. The performance of RRO may be degraded due to this harmonic.

A notch filter may be used to reduce the interference. However, the (BER (bit error rate)) performance of the data channel may still be affected or degraded by this notch filter.

Figure 2:
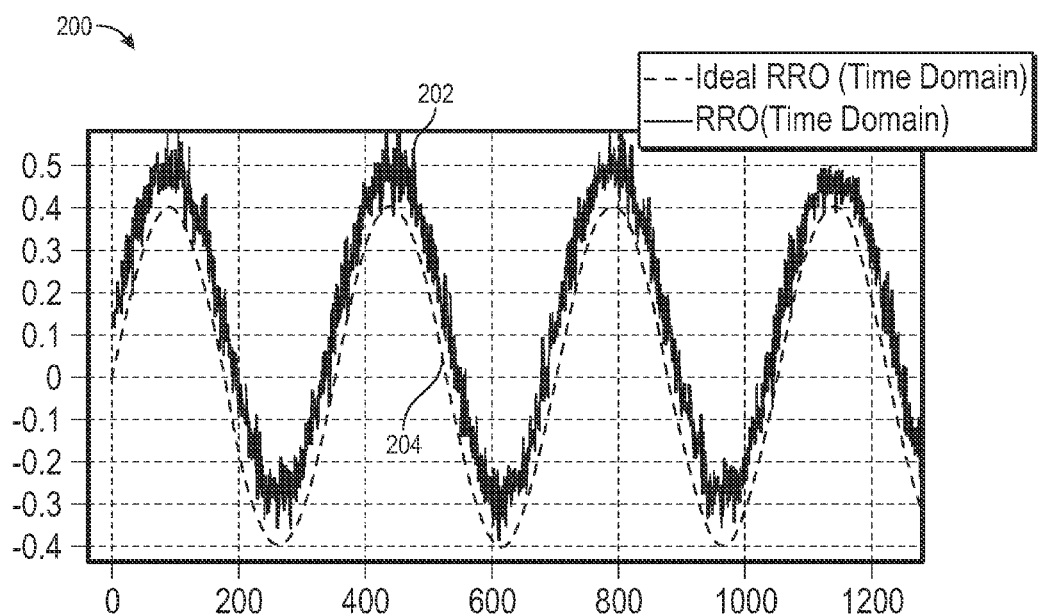
FIG. 2 shows a diagram illustrating a DC (direct current) shift of a PES (position error signal) at a dual-frequency servo system.

Another drawback of the dual-frequency servo system (for example dual-frequency servo bursts for dedicated servo) may be that the spacing loss at different frequency may be different. The spacing loss compensation may be needed to be done in order to cancel the DC (direct current) shift (at the PES). This spacing loss difference may cause a DC shift at PES, as shown in FIG. 2. The spacing loss at different frequency may be different, and thus the spacing loss compensation must be done for the dual-frequency servo burst.

FIG. 2 shows a diagram 200 illustrating the DC shift of (or at) the PES at a dual-frequency servo system. This DC shift may be caused (or induced) by the different spacing loss at different frequency. Curve 202 shows the real RRO in time domain, while curve 204 shows the ideal RRO in time domain.

The different spacing loss may induce a DC shift in PES and may misinterpret the FH (fly height) variations due to disk surface and outplace motions into estimated PES as an input disturbance.

Figure 3A:
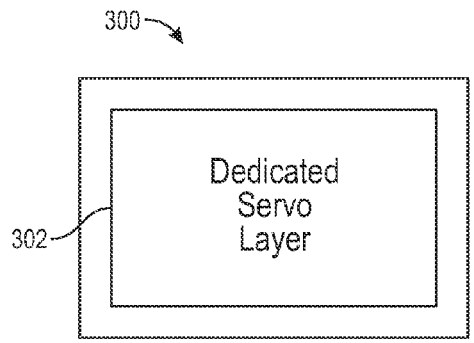
FIG. 3A shows a recording medium according to various embodiments.

FIG. 3A shows a recording medium 300 according to various embodiments. The recording medium 300 may include a dedicated servo layer 302 configured to provide servo information. The dedicated servo layer 300 may include a plurality of tracks (not shown in FIG. 3A). A first track may include a first servo signal. The first servo signal may include first servo bursts of a pre-determined frequency. A second track adjacent to the first track may include a second servo signal. The second servo signal may include second servo bursts of the pre-determined frequency.

In other words, in a dedicated servo layer, adjacent servo tracks may have servo bursts with signals of the same frequency.

According to various embodiments, the first servo bursts may be orthogonal to the second servo bursts.

According to various embodiments, the first servo bursts may include a sine signal. According to various embodiments, the second servo bursts may include a sine signal, which is phase shifted compared to the first servo bursts, for example shifted by 90 degrees.

According to various embodiments, the first servo bursts may include a sine signal. According to various embodiments, the second servo bursts may include a cosine signal.

According to various embodiments, the first servo bursts may be negated (in other words: inverted; in other words: differential; in other words: multiplied by minus one; in other words: multiplied by −1) to the second servo bursts.

According to various embodiments, the first servo bursts may include a sine signal. According to various embodiments, the second servo bursts may include a sine signal, which is phase shifted compared to the first servo bursts, for example shifted by 180 degrees.

According to various embodiments, the first servo bursts may include a sine signal. According to various embodiments, the second servo bursts may include a negated sine signal (in other words: an inverted sine signal; in other words: a differential sine signal; in other words: a sine signal multiplied by minus one; in other words: a −sine signal).

According to various embodiments, the first servo signal may include a plurality of alternately arranged preambles and servo bursts. According to various embodiments, the second servo signal may include a plurality of alternately arranged preambles and servo bursts.

According to various embodiments, the first servo signal and the second servo signal may include information for providing positioning information.

Figure 3B:
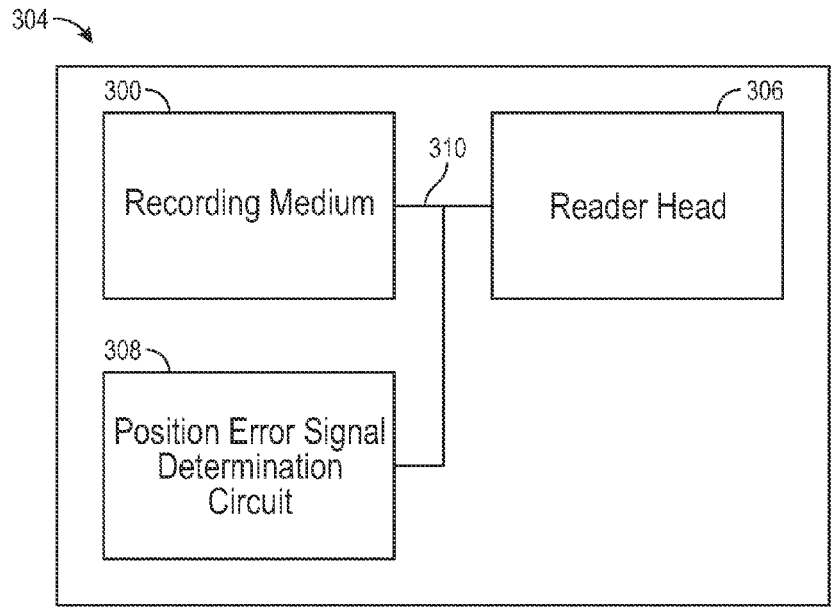
FIG. 3B shows a data storage device according to various embodiments.

FIG. 3B shows a data storage device 304 according to various embodiments. The data storage device 304 may include a recording medium according to various embodiments, for example the recording medium 300 of FIG. 3A described above. The data storage device 304 may further include a reader head 306, like will be described in more detail below. The data storage device 304 may further include in position error signal determination circuit 308, like will be described in more detail below. The recording medium 300, the reader head 306, and the position error signal determination circuit 308 may be coupled with each other, like indicated by lines 310, for example electrically coupled, for example using a line or a cable, and/or mechanically coupled.

According to various embodiments, the recording medium 300 may further include a data layer configured to record data therein.

According to various embodiments, the reader head 306 may be configured to read a signal from the recording medium 300.

According to various embodiments, the position error signal determination circuit 308 may be configured to determine a position error signal based on the read signal.

According to various embodiments, the position error signal determination circuit 308 may further be configured to determine the position error signal based on an average of the read signal over a plurality of servo cycles.

According to various embodiments, the position error signal determination circuit 308 may further be configured to determine the position error signal based on multiplying the read signal with a waveform of the pre-determined frequency.

Figure 3C:
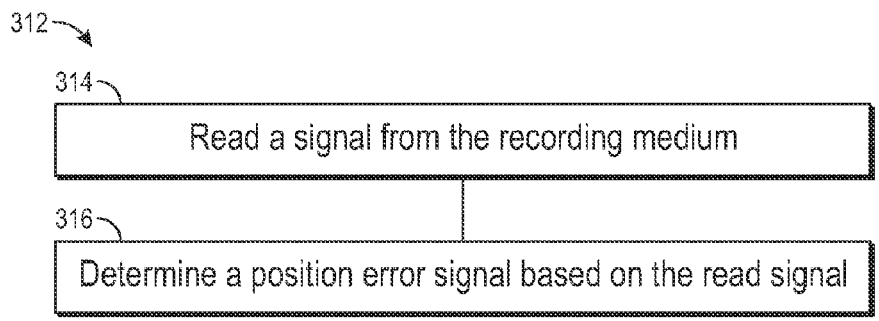
FIG. 3C shows a flow diagram illustrating a method for determining a position error signal in a recording medium according to various embodiments.

FIG. 3C shows a flow diagram 312 illustrating a method for determining a position error signal in a recording medium according to various embodiments. The recording medium may include a dedicated servo layer configured to provide servo information. The dedicated servo layer may include a plurality of tracks. A first track may include a first servo signal. The first servo signal may include first servo bursts of a pre-determined frequency. A second track adjacent to the first track may include a second servo signal. The second servo signal may include second servo bursts of the pre-determined frequency. In 314, a signal may be read from the recording medium. In 316, a position error signal may be determined based on the read signal.

According to various embodiments, the position error signal may be determined based on an average of the read signal over a plurality of servo cycles.

According to various embodiments, the position error signal may be determined based on multiplying the read signal with a waveform of the pre-determined frequency.

According to various embodiments, the first servo bursts may be orthogonal to the second servo bursts.

According to various embodiments, the first servo bursts may be negated to the second servo bursts (in other words: may be inverted; in other words: may be differential; in other words: may be multiplied by minus one; in other words: may be multiplied by −1).

According to various embodiments, servo control systems in disk drives may be provided.

According to various embodiments, orthogonal servo bursts for digital PES demodulation for dedicated servo may be provided.

According to various embodiments, a synchronized average detector and an orthogonal servo pattern may overcome the above stated problems of commonly used devices and methods.

Figure 4A:
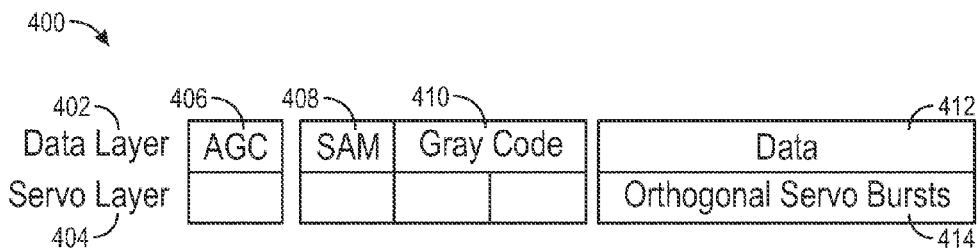
FIG. 4A and FIG. 4B show a servo-pattern layout for dedicated servo according to various embodiments.
Figure 4B:
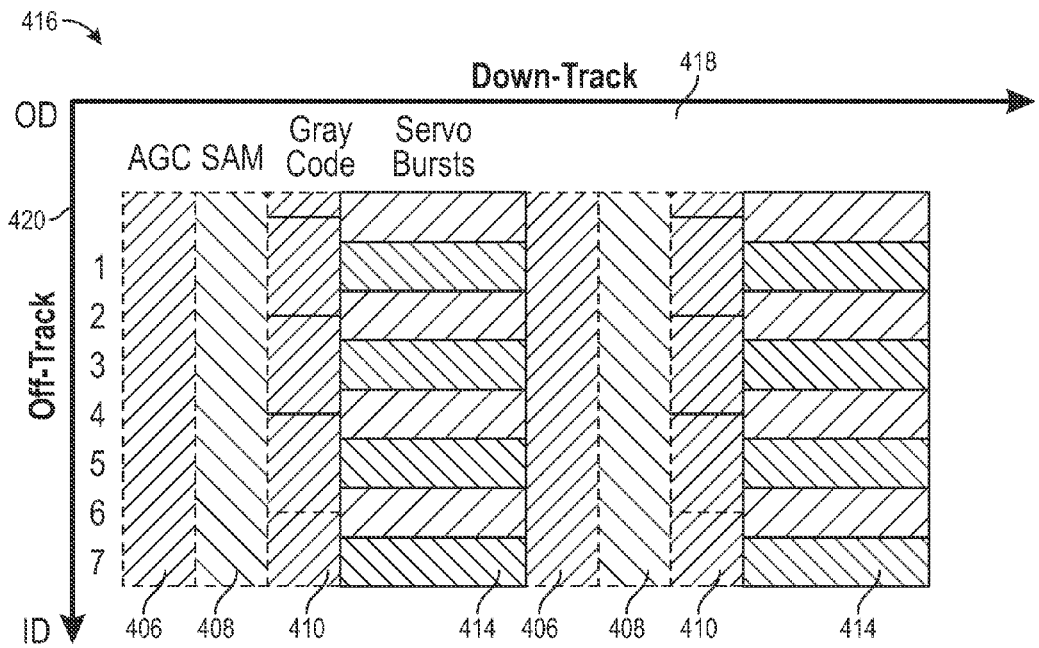

FIG. 4A and FIG. 4B show a servo-pattern layout for dedicated servo according to various embodiments. In illustration 400 of FIG. 4A, a data layer 402 and a servo layer 404 are shown. An auto gain control (AGC) 406, a sector address mark (SAM) 408, a gray code 410, data 412 and orthogonal servo bursts 414 are shown. In FIG. 4B, an illustration 416 illustrates the distribution of AGC 406, SAM 408, gray code 410, and servo bursts 414 in down-track direction 418 and off-track direction 420 (for example from outer diameter OD to inner diameter ID). AGC 406, SAM 408, and gray code 410 may provide coarse position for seeking, while the servo bursts 414 may provide fine position for track following.

Figure 5:
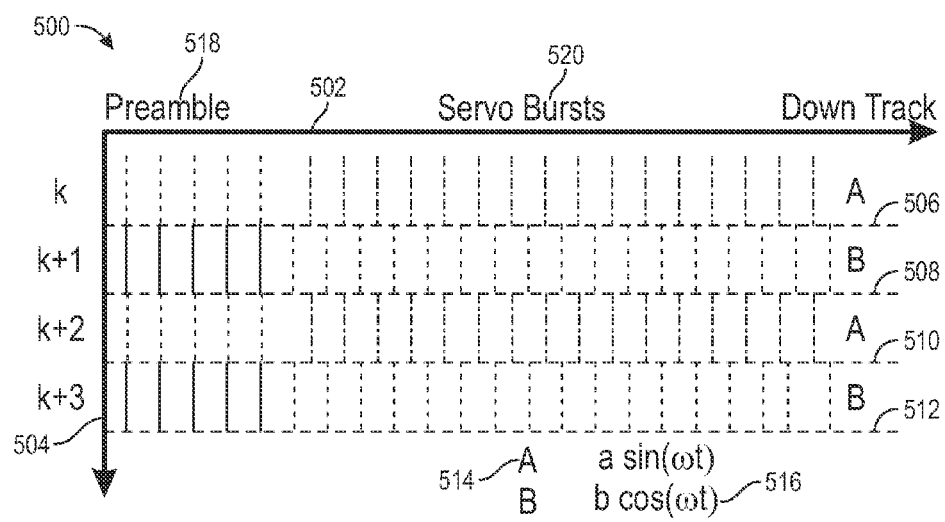
FIG. 5 shows an orthogonal servo pattern according to various embodiments.

According to various embodiments, a single tone $f_1$ may be written at one track and an orthogonal wave form of $f_1$ may be written at another (for example neighboring) track, as shown in FIG. 5.

FIG. 5 shows an orthogonal servo pattern 500 (in other words: an orthogonal layout of a servo pattern) according to various embodiments. A down track direction 502 and an off track direction 504 are shown. A preamble portion 518 may be provided on each track (for example an identical preamble on each track). Servo bursts 520 may be provided in a subsequent portion of each track. A single tone (for example of a frequency $f_1$) may be written at one track, and the orthogonal waveform may be written at another track. The PES may then be estimated by simple AM (amplitude modulation) demodulation.

For example, a first signal A may be written on a k-th track 506 (with an integer number k). The signal A may for example be a sine signal, for example according to a sin(ωt), like indicated by formula 514 in FIG. 5, with amplitude a and angular velocity ω. For example, a second signal B may be written on a k+1-th track 508. The signal B may for example be a cosine signal, for example according to b cos(ωt), like indicated by formula 516 in FIG. 5, with amplitude b and angular velocity ω. For example, the first signal A may then be provided again at the subsequent k+2-th track 510. For example, the second signal B may then be provided again at the subsequent k+3-th track 512. In other words: the orthogonal signals A and B may be provided alternatingly on neighboring tracks.

The orthogonal servo pattern according to various embodiments may eliminate the need to do spacing loss compensation. Performance analysis and simulation results show that the orthogonal servo pattern according to various embodiments may outperform dual-frequency system in NRRO (non-repeatable runout) performance.

Figure 6A:
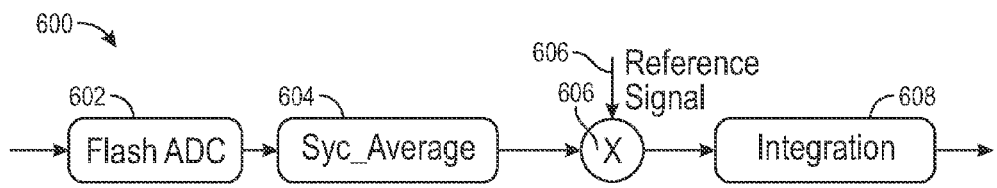
FIG. 6A shows a configuration of a synchronized average detector according to various embodiments.

According to various embodiments, a synchronized average detector may be provided. The synchronized average detector according to various embodiments may reduce the interference from data layer FIG. 6A shows a configuration of a synchronized average detector 600 according to various embodiments. The synchronized average detector 600 may for example be used for orthogonal servo patterns according to various embodiments or for differential servo patterns according to various embodiments. A flash ADC (analog digital converter) 602 may provide a read back signal. The read back signal may be synchronized and averaged in a synchronization and averaging circuit 604 over a plurality of (for example hundreds of) servo cycles to reduce the interference from data layer as well as the noise. The result may then be multiplied in multiplier 606 with a reference signal of $f_1$. The amplitude of the servo signal may be estimated by doing integration over one servo cycle in integrator 608. The synchronized average detector 600 may make full use of the continuous servo pattern. For example, for the number of the averaged servo cycle being 200, the SNR gain over the coupled data may be 23 dB.

Figure 6B:
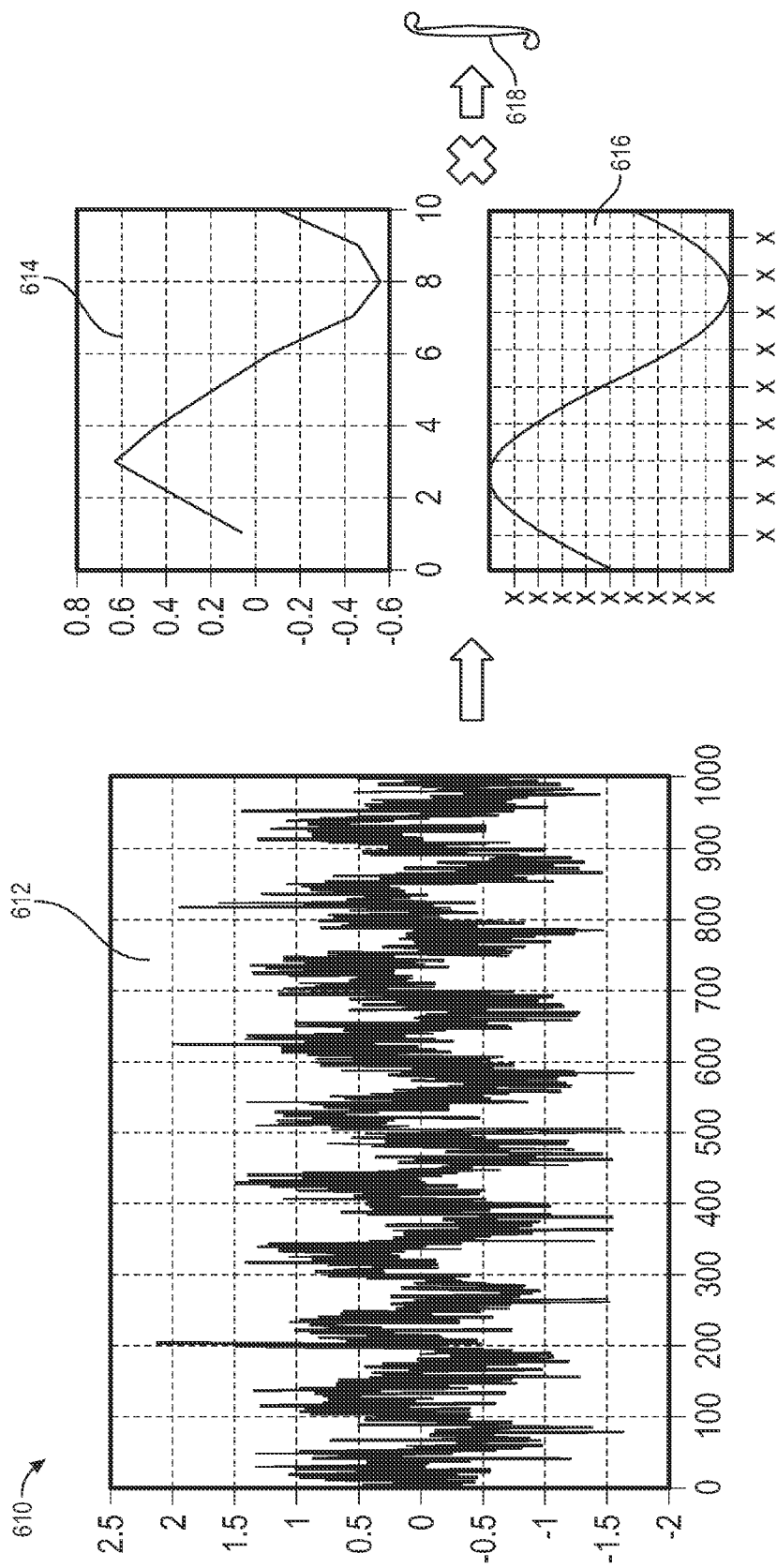
FIG. 6B shows an illustration of plots of data processed in the synchronized average detector.

FIG. 6B shows an illustration 610 of plots of data processed in the synchronized average detector 600. A read back signal 612 is shown. An averaged read back signal for one servo cycle (for example from hundreds of servo cycles) 614 is shown. A reference signal 616 with the same frequency as the servo signal is shown. Amplitude of the (averaged) servo signal 614 may be estimated by multiplying the averaged servo signal 614 and the reference signal 616, for example in the sense of a point-wise multiplication and then integration of the product, like indicated by integration sign 618.

An orthogonal servo system according to various embodiments may be described as follows: write one single tone $f_1$ at one track, write an orthogonal waveform of $f_1$ at another track. Assume the amplitude of $f_1$ and its quadric signal are A and B respectively. A and B may be estimated using the mentioned synchronized average detector according to various embodiments. PES can be expressed as (A−B)/(A+B). By using the synchronized average detector, the interference from the coupled data may be reduced. Assuming that the number of average is 200, the signal to interference ration (SIR) gain is around 23 dB.

The performance of the orthogonal servo pattern according to various embodiments may be analyzed as follows: The read back signal y of one servo cycle may be expressed in vector format as $$y = aw_1 + bw_2 + n.$$

wherein a is an amplitude of the first signal, $w_1$ is the normalized first signal, b is an amplitude of the second signal, $w_2$ is the normalized second signal, and n is noise. $w_1$ and $w_2$ may be orthogonal according to various embodiments.

The amplitude can be estimated by multiplying the read back signal with the normalized first signal and with the normalized second signal, respectively. Multiplication of the read back signal with the normalized first signal may yield the an estimate â of the amplitude a of the first signal as:

$$\hat{a} = w_1^H y = a + b w_1^H w_2 + w_1^H n$$

and multiplication of the read back signal with the normalized second signal may yield an estimate b̂ of the amplitude b of the second signal as $$\hat{b} = w_2^H y = b + a w_2^H w_1 + w_2^H n.$$

Then, PES may then be expressed as a normalized difference between the estimate â of the amplitude a of the first signal and the estimate $\hat{b}$ of the amplitude b of the second signal. For example, the PES may be determined as:

$$pes = \frac{\hat{a} - \hat{b}}{\hat{a} + \hat{b}}$$

It is obvious that if $w_1$ and $w_2$ are orthogonal ($w_1^H w_2 = 0$), the above expression may be optimized (since the interference items $bW_1^H W_2$ and $aW_2^H W_1$ are all zeros) and may have the best performance (in other words: the estimate may be a good or the best possible estimate). Thus, the orthogonal servo pattern according to various embodiments may outperform dual-frequency servo system and the dual-frequency servo burst in reducing the effect of interference.

As described above, the digital PES demodulation may determine an estimate $\hat{a}$ of the amplitude a of the first signal and an estimate $\hat{b}$ of the amplitude b of the second signal. For example, if the first signal is a sine signal, and the second signal is a cosine signal, the readback signal may be signal$_{readback}$ = a sin($\omega$t) + b cos($\omega$t) + n + data if for example additionally the data is taken into account. Then, the estimate $\hat{a}$ of the amplitude a of the first signal may be derived as:

$$\hat{a} = \frac{\int_0^T signal_{readback} \sin(\omega t)}{T} * 2$$

wherein T is the length of a servo cycle, and the estimate $\hat{b}$ of the amplitude b of the second signal may be derived as:

$$\hat{b} = \frac{\int_0^T signal_{readback} \cos(\omega t)}{T} * 2$$

By synchronized averaging, both the noise n and the data may be averaged out over hundreds of servo cycles for the determination of the estimates of the amplitudes. However, the HER (bit error rate) performance of data channel may be not degraded, as the data signal may be recovered as follows:

data$_{decoupled}$ = signal$_{readback}$ - $\hat{a}$ sin($\omega$t) - $\hat{b}$ cos($\omega$t)

The orthogonal servo pattern according to various embodiments may eliminate the need to do spacing loss compensation for dual-frequency servo system, since orthogonal servo pattern according to various embodiments includes a single tone servo bursts which have the exactly same spacing loss factor.

In the following, an analysis of the NRRO will be described.

Figure 7A:
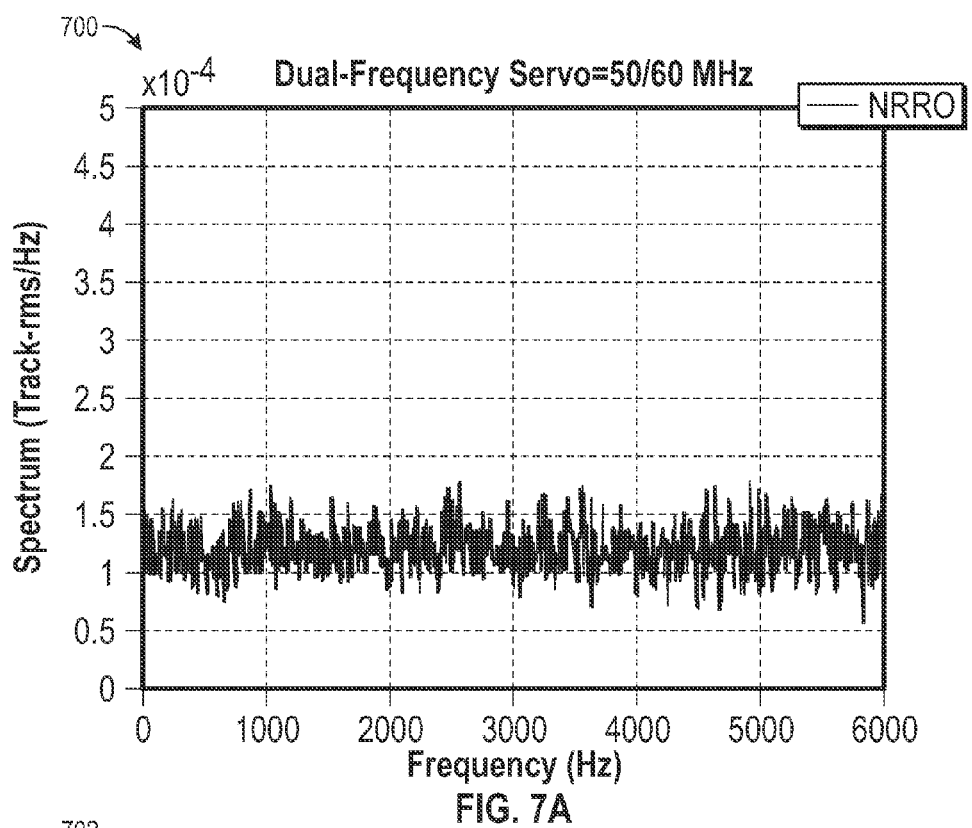
FIG. 7A shows a diagram illustrating the NRRO (non-repeatable runout) of a dual frequency servo.

FIG. 7A shows a diagram 700 illustrating the NRRO of a dual frequency servo (for example with a first frequency of 50 MHz and a second frequency of 60 MHz).

Figure 7B:
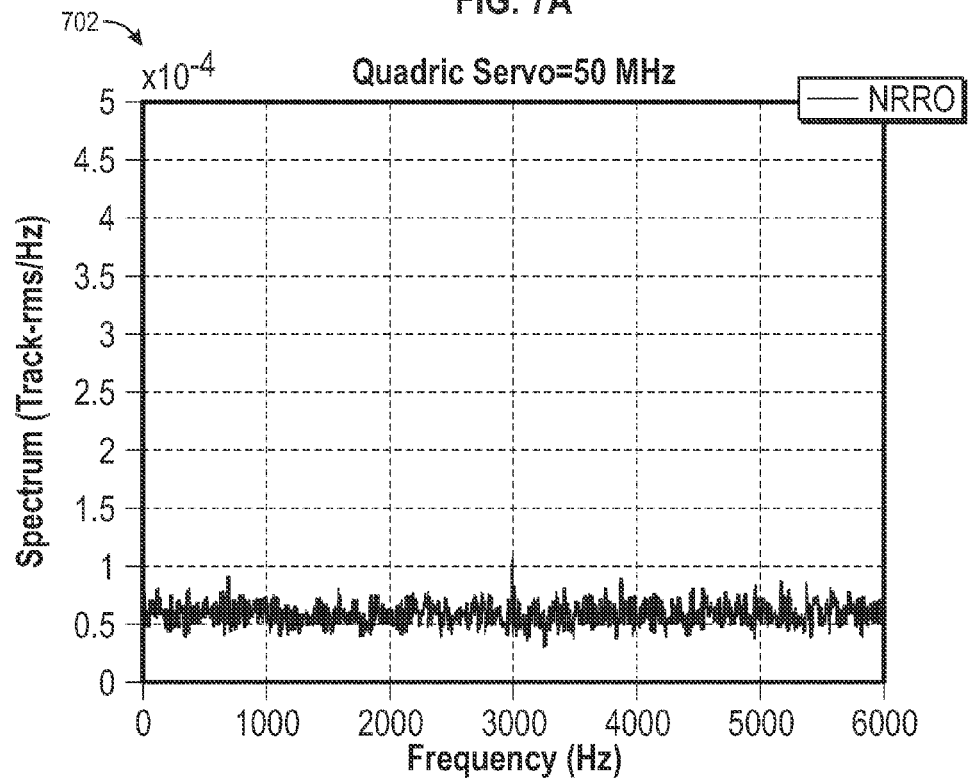
FIG. 7B shows a diagram illustrating the NRRO of the orthogonal servo pattern according to various embodiments.

FIG. 7B shows a diagram 702 illustrating the NRRO of the orthogonal servo pattern according to various embodiments. It can be observed that the NRRO performance of orthogonal servo is much better than the conventional wedge based servo system. And it can also outperform the dual-frequency servo system. The results of the orthogonal servo pattern according to various embodiments may be better than conventional wedge based servo system (the NRRO for the wedge based convention servo system may be around $10^{-3}$, while the orthogonal servo pattern according to various embodiments plus synchronized average detector may be only $0.5*10^{-4}$). It is to be noted that since only one single tone is used, there is no need to do spacing loss compensation any more.

The NRRO performance of the synchronized average detector and the orthogonal servo pattern according to various embodiments may be $0.5*10^{-4}$, like stated above, and thus may be better than synchronized average detector and a dual-frequency servo pattern. Furthermore, its performance may be better than normal wedge based servo system. A reason may be that a synchronized average detector may make full use of the continuous servo pattern.

According to various embodiments, a synchronized average detector may be provided to effectively reduce demodulation noise.

According to various embodiments, the synchronized average method may also effectively reduce the PES demodulation noise caused by the head/media noise.

According to various embodiments, orthogonal servo bursts according to various embodiments may solve the problem of different spacing loss. The NRRO performance may also be improved due to the orthogonal property of the servo bursts.

The orthogonal servo burst according to various embodiments may provide a method to decouple servo signal from data signal.

According to various embodiments, for buried servo (wherein for example the servo layer is provided underneath the data layer on the same disk), the phase alignment may be done at the AGC part, and the orthogonal servo pattern may be implemented.

According to various embodiments, the reader may capture the signal from two adjacent servo tracks, thus the PES detection may become the detection of the amplitude of a single tone signal.

According to various embodiments, a synchronized average detector may be provided. This detector may reduce the effect of interference and media noise.

According to various embodiments, for orthogonal servo burst, there may be no need to do spacing loss compensation, since they are using the same single tone signal.

Performance analysis and simulation results demonstrate that the orthogonal servo burst according to various embodiments may outperform dual-frequency servo burst.

According to various embodiments, differential servo bursts for digital PES demodulation for dedicated servo may be provided.

Figure 8:
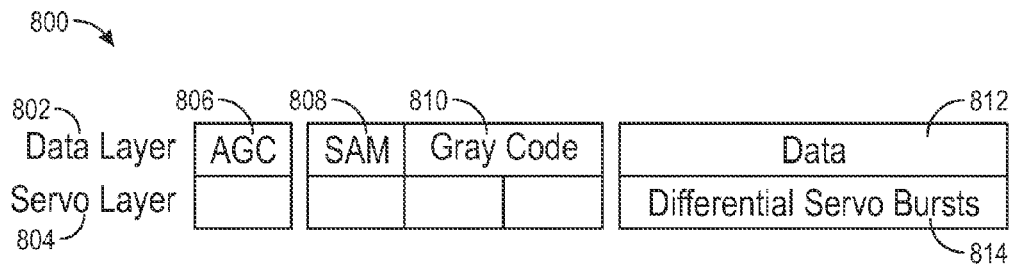
FIG. 8 shows an illustration of a differential servo bursts layout for dedicated servo according to various embodiments.

FIG. 8 shows an illustration 800 of a differential servo bursts layout for dedicated servo according to various embodiments. In illustration 800, a data layer 802 and a servo layer 804 are shown. An auto gain control (AGC) 806, a sector address mark (SAM) 808, a gray code 810, data 812 and differential servo bursts 814 are shown.

Figure 9:
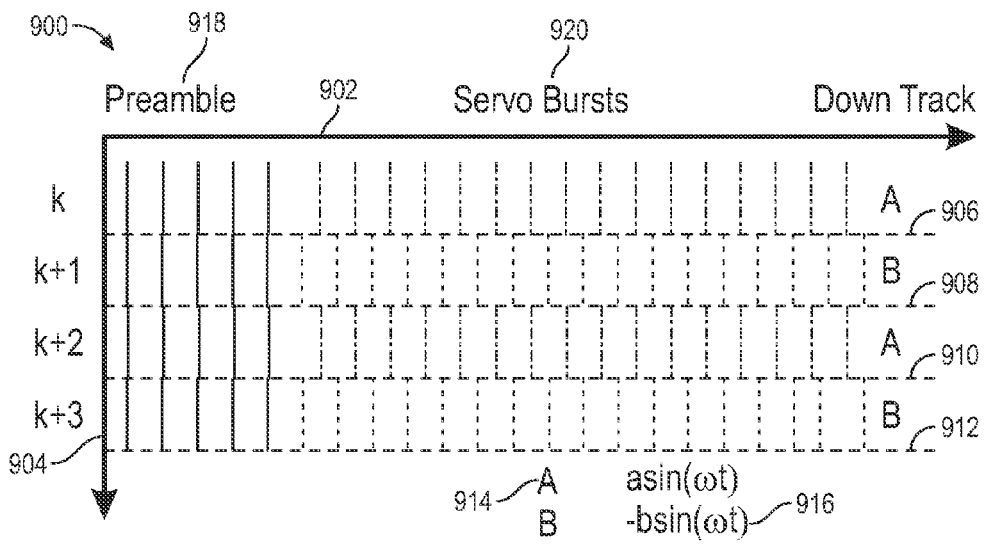
FIG. 9 shows a differential servo pattern according to various embodiments.

According to various embodiments, a single tone $f_1$ (in other words: a signal of one frequency $f_1$) may be written at one track, and a differential wave form, for example a differential waveform of $f_1$ (in other words: a waveform of the same frequency $f_1$), may be written at another track (for example at an adjacent track), as shown in FIG. 9.

FIG. 9 shows a differential servo pattern 900 (in other words: a differential layout of a servo pattern; in other words: a configuration of the differential servo system) according to various embodiments. A down track direction 902 and an off track direction 904 are shown. A preamble portion 918 may be provided on each track (for example an identical preamble on each track). Servo bursts 920 may be provided in a subsequent portion of each track. A single tone (for example of a frequency $f_1$) may be written at one track, and the differential waveform may be written at another track. The PES may then be estimated by simple AM (amplitude modulation) demodulation.

For example, a first signal A may be written on a k-th track 906 (with an integer number k). The signal A may for example be a sine signal, for example according to a sin(ωt), like indicated by formula 914 in FIG. 9, with amplitude a and angular velocity ω. For example, a second signal B may be written on a k+1-th track 908. The signal B may for example be a negative sine signal, for example according to b −sin(ωt), like indicated by formula 916 in FIG. 9, with amplitude b and angular velocity ω. For example, the first signal A may then be provided again at the subsequent K+2-th track 910. For example, the second signal B may then be provided again at the subsequent k+3-th track 912. In other words: the differential signals A and B may be provided alternatingly on neighboring tracks.

Figure 10:
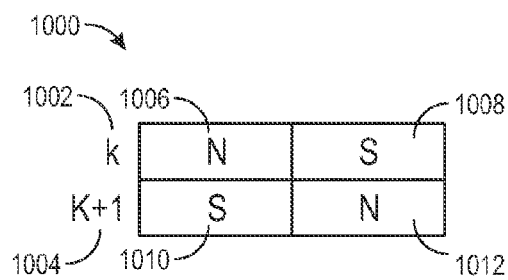
FIG. 10 shows an illustration of the differential servo bursts according to various embodiments.

FIG. 10 shows an illustration 1000 of the differential servo bursts according to various embodiments. A k-th track 1002 and a k+1-th track 1004 are shown. In a first portion 1006 of the k-th track 1002, a first waveform may be provided (for example indicating magnetic North pole), and in a second portion 1008 of the k-th track 1002 a second waveform may be provided (which for example is the negative of the first wave form, for example indicated by S, for example indicated magnetic South pole). In the adjacent k+1-th track 1004, in the first portion 1010, the second waveform may be provided, and in the second portion 1012, the first waveform may be provided.

In other words, according to various embodiments, in the differential servos bursts, signals of the same frequency for A and B of signals for adjacent servo tracks may be provided, but with a different phase (for example with a 180 degree phase shift).

The differential servo pattern according to various embodiments may overcome the problems of a two frequency servo pattern.

The differential servo pattern according to various embodiments may reduce interference from coupled data and thus may reduce the 90 Hz harmonic in RRO. Performance analysis shows that, compared with the dual-frequency system, the differential servo pattern according to various embodiments may have 3 dB SNR gain.

The differential servo pattern according to various embodiments may reduce the interference from servo layer to data channel. When on track, the interference from the servo layer may be completely cancelled. Thus, using the differential servo pattern according to various embodiments may improve the performance of the data channel.

Compare with the dual-frequency system, the differential servo pattern according to various embodiments may also eliminate the need to do spacing loss compensation and thus may reduce the complexity of the servo system.

The differential servo system according to various embodiments may be described as follows: one single tone $f_1$ may be written at one track, the differential waveform of $f_1$ may be written at another track. Assume the amplitude of $f_1$ may be expressed as A. Assume the amplitude of the differential signal of $f_1$ may be expressed as B. The amplitude of the servo signal may be expressed as (A−B). Assume (A+B) may be normalized as 1. According to various embodiments, PES demodulation may then become the detection of the amplitude A−B of the servo signal, in other words, the detection of the amplitude of the signal to which both adjacent servo tracks contribute.

The performance of the differential servo pattern according to various embodiments (for example with respect to demodulation noise) may be analyzed as follows: The read back signal y (which may be a N times 1 vector, wherein N may be the number of samples used for describing one servo cycle) of one servo cycle (for example read back from ADC602 of FIG. 6A) may be expressed in vector format as $$y=(A-B)w+n$$

wherein A may be the amplitude of the servo signal, B may be the amplitude of the differential servo signal, w may be a normalized servo signal (for example the sine function in the embodiment described above), and n may be noise.

By multiplying y with the reference signal w, the following result r may be obtained:

$$r=w^H y=(a-b)w^H w+w^H n=(a-b)+w^H n$$

Thus, the noise power may be calculated as:

$$w^H n \times (w^H n)^H = \delta^2.$$

where $\delta^2$ is the noise power.

For orthogonal or dual-frequency servo system, the read back signal may be expressed as $$y_2 = aw_1 + bw_2 + n$$

As described above, the amplitudes of the respective contribution of the two servo tracks may be estimated as $$\hat{a} = w_1^H y_2 = a + w_1^H n$$

and $$\hat{b} = w_2^H y_2 = b + w_2^H n$$

Then, the PBS may be expressed as $$\hat{a} - \hat{b} = (a-b) + (w_1^H - w_2^H) n$$

It is obvious that the noise power for the dual frequency servo or for the orthogonal servo may be expressed as:

$$(w_1^H - w_2^H) n \times ((w_1^H - w_2^H) n)^H = 2\delta^2$$

Thus, the differential servo pattern according to various embodiments may have 3 dB SNR (signal to noise ratio) gain over orthogonal or dual-frequency servo system.

According to various embodiments, for example when w is a sine function, the signal processing for digital PES demodulation may be as follows. The read back signal may be $$signal_{readback} = (a-b)\sin(\omega t) + n + data$$

including the data signal.

By multiplying with the sine function and integrating over one servo pattern, an estimate for the amplitude of the feedback signal may be obtained as follows:

$$\widehat{a-b} = \frac{\int_0^T signal_{readback}\sin(\omega t)}{T} * 2$$

The PES may then for example be determined as $$pes = \frac{\hat{a} - \hat{b}}{\hat{a} + \hat{b}}$$

Assume that a+b is normalized as 1 and the fly height is constant, the digital PES demodulation may be simplified to estimate the amplitude of the sinusoidal at one frequency.

It is to be noted that, when the head is on track (for example about in the middle between two servo tracks, for example a=b), the servo signal component may be minimized (or about zero) in the read back signal which may be fed into data channel for data process directly.

Figure 11A:
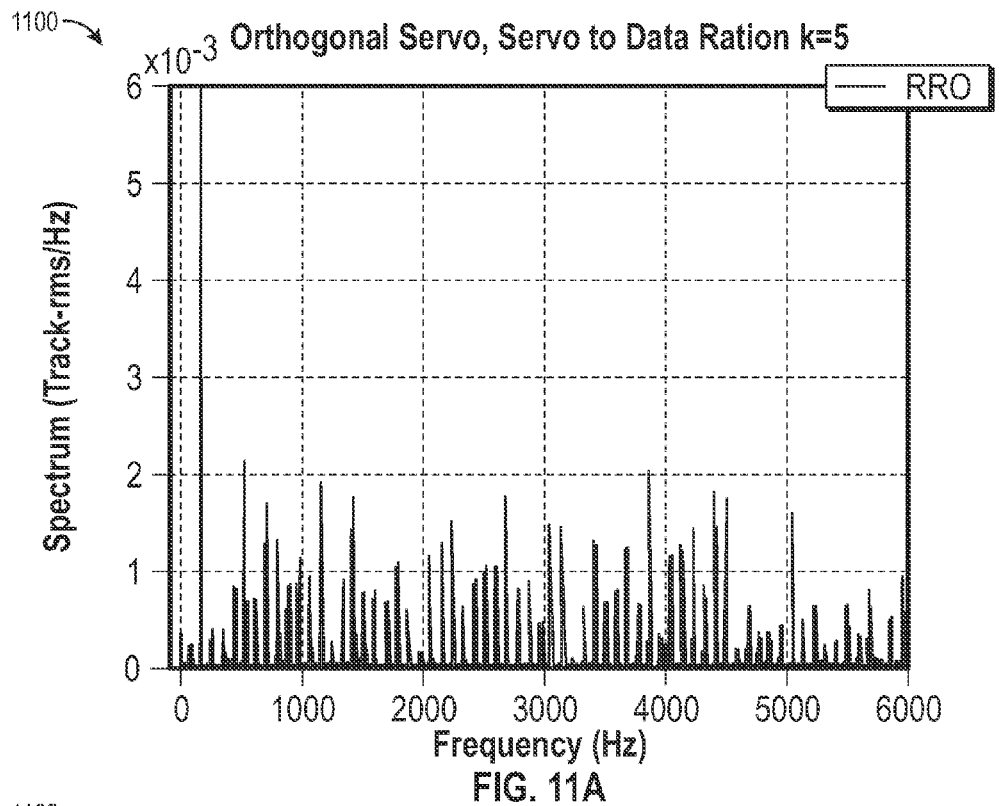
FIG. 11A and FIG. 11B show simulation results according to various embodiments.
Figure 11B:
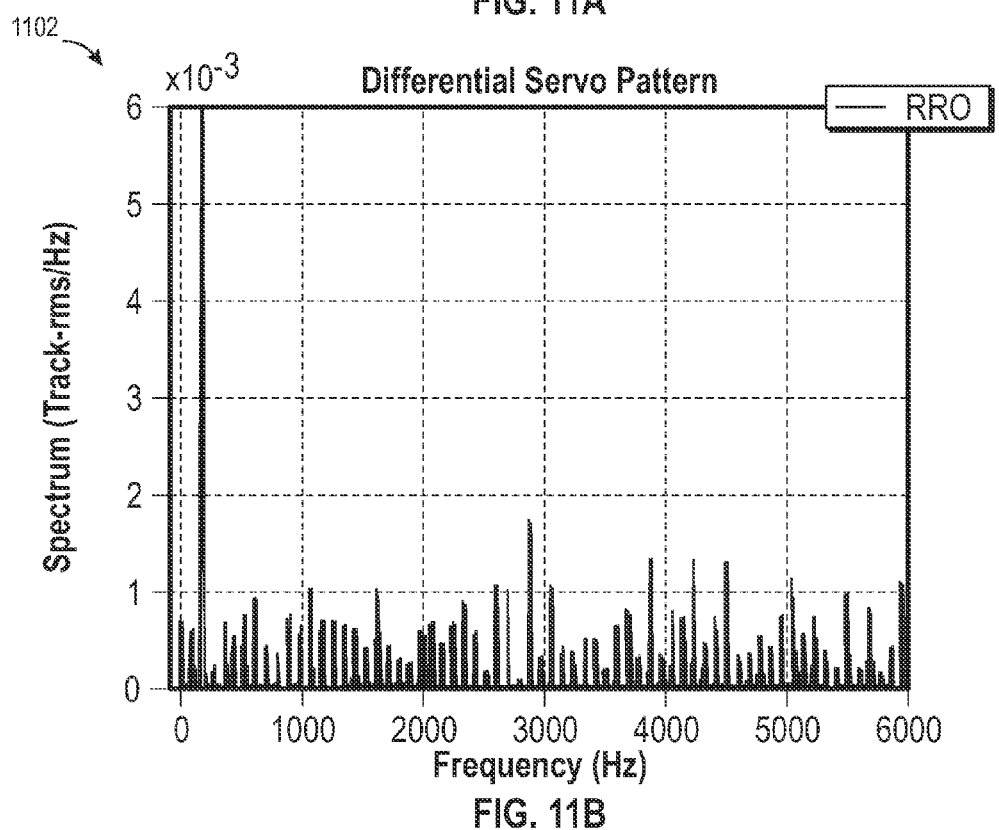

FIG. 11A and FIG. 11B show simulation results according to various embodiments. In the comparison of the RRO in PES noise, FIG. 11A shows a diagram 1100 illustrating simulation results for the RRO of the orthogonal servo according to various embodiments, and FIG. 11B shows a diagram 1102 illustrating simulation results for the RRO of the differential servo according to various embodiments. It may be seen that the RRO performance of the differential servo system according to various embodiments is better. Parameter K may stand for the ratio between data and servo, K=5 may mean that data signal is 5 times as strong as the servo signal. The results demonstrate that with the help of the synchronized average detector and differential servo pattern, the servo performance is acceptable even if the data signal is much stronger than the servo signal.

As can be seen from the RRO performance comparison between orthogonal servo in FIG. 11A and differential servo system in FIG. 11B, the differential servo according, to various embodiments may have better performance than orthogonal servo system according to various embodiments. The RRO performance of the differential servo pattern according to various embodiments may outperform the orthogonal servo pattern system according to various embodiments and the dual-frequency servo system. The reason may be that the orthogonal servo pattern has 3 dB SNR gain over the orthogonal servo pattern system according to various embodiments and the dual-frequency servo system.

It is to be noted, that when on track (A=B), the interference from servo layer to data channel may be 0. Thus the performance of the data channel may be improved.

The differential servo pattern according to various embodiments may eliminate the needs to do spacing loss compensation. In dual-frequency servo system, the spacing loss at different frequency is different. This may cause a DC shift at PES as described above. To solve this problem, spacing loss compensation is required. By using the differential servo system according to various embodiments, there may be no need to perform spacing loss compensation, thus, according to various embodiments the complexity of the servo system may be reduced.

In the following, an effect of a fly height change will be described.

Figure 12:
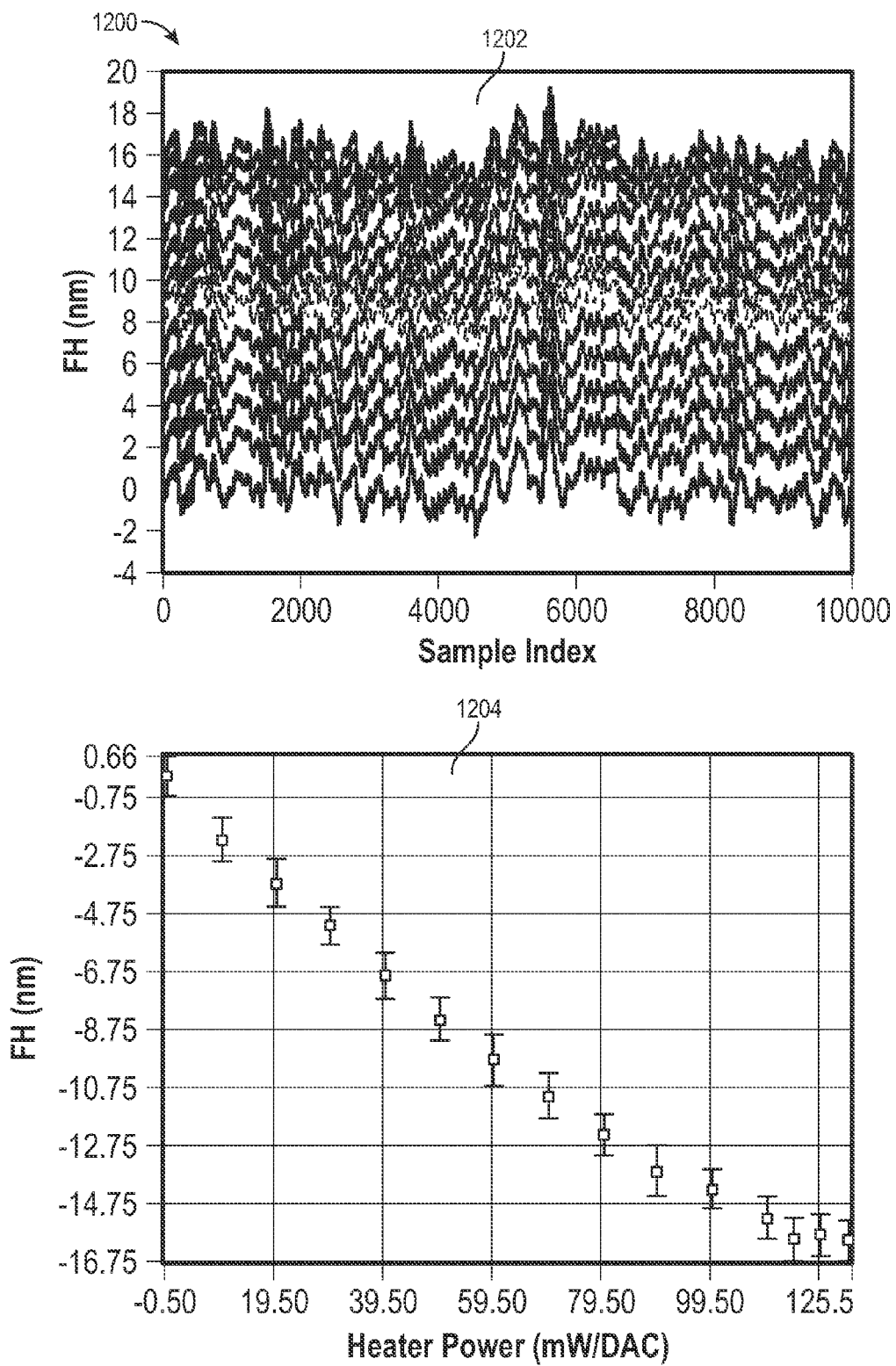
FIG. 12 shows a screen shot of a simulation.

FIG. 12 shows a screen shot 1200 of time domain fly height variation for different thermal TFC (Thermal Fly-height Control) heater power on the top left chart 1202, and the measured average fly height for different heater power on the top right chart 1204.

Fly height may be controlled by heater power. Changing the heater power from 70 mw to 80 mw may result in about 1.5 nm fly height change. Fly height change may cause noticeable signal amplitude change, but may be smaller than the amplitude drift.

Figure 13A:
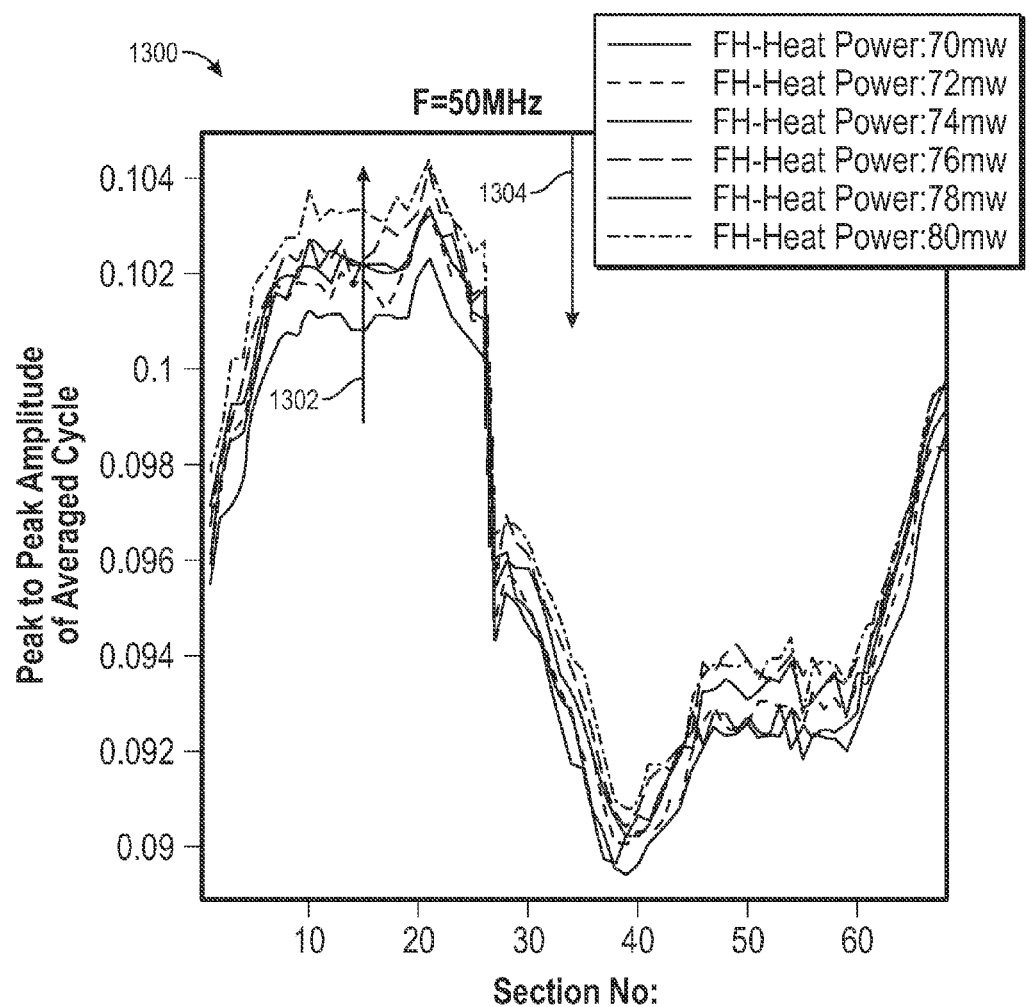
FIG. 13A shows a diagram illustrating a relationship between a sector number and a peak to peak amplitude of an averaged cycle for a frequency of 50 MHz and various heater powers.
Figure 13B:
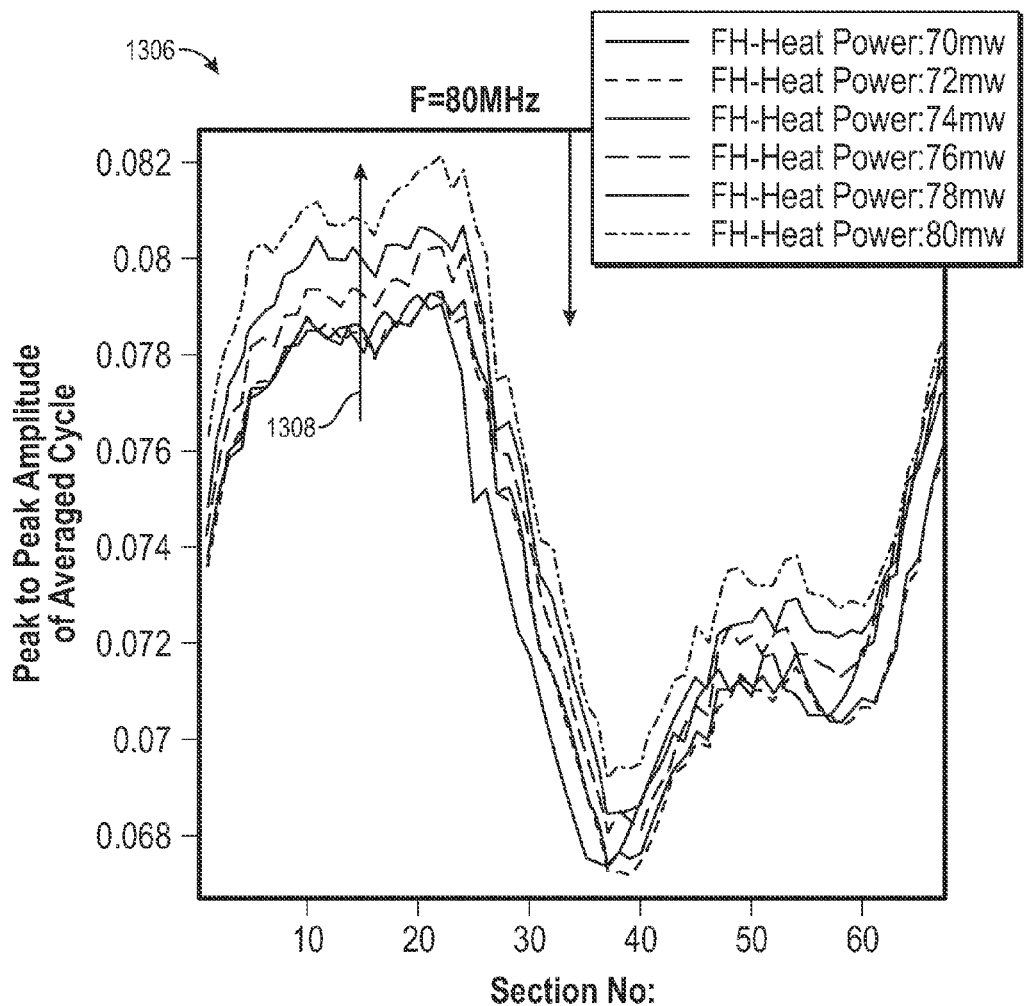
FIG. 13B shows a diagram illustrating a relationship between a sector number and a peak to peak amplitude of an averaged cycle for a frequency of 80 MHz and various heater powers.

FIG. 13A shows a diagram 1300 illustrating a relationship between a sector number and a peak to peak amplitude of an averaged cycle for a frequency of 50 MHz and various heater powers. FIG. 13B shows a diagram 1306 illustrating a relationship between a sector number and a peak to peak amplitude of an averaged cycle for a frequency of 80 MHz and various heater powers. A trend of the envelop amplitude change (indicated by arrow 1302 in FIG. 13A and arrow 1308 in FIG. 13B) corresponding to FH (fly height) heater power (for which a change is indicated by arrow 1304 in the legend of FIG. 13A, which also may apply to FIG. 13B) may be that for increasing FH heater power (corresponding to the direction of arrow 1304), the envelope amplitude (for example of the peak to peak amplitude) may increase (corresponding to direction of arrows 1302 and 1308).

In the following, an amplitude drifting in a 50 MHz single frequency signal will be described. Amplitude may have a repeatable drifting sync to revolution, for example due to disk deformation which has similar effect as fly-height variation. Within each sector, cross-correlation between a raw signal and a sinusoid of a same frequency may also drift.

Figure 14A:
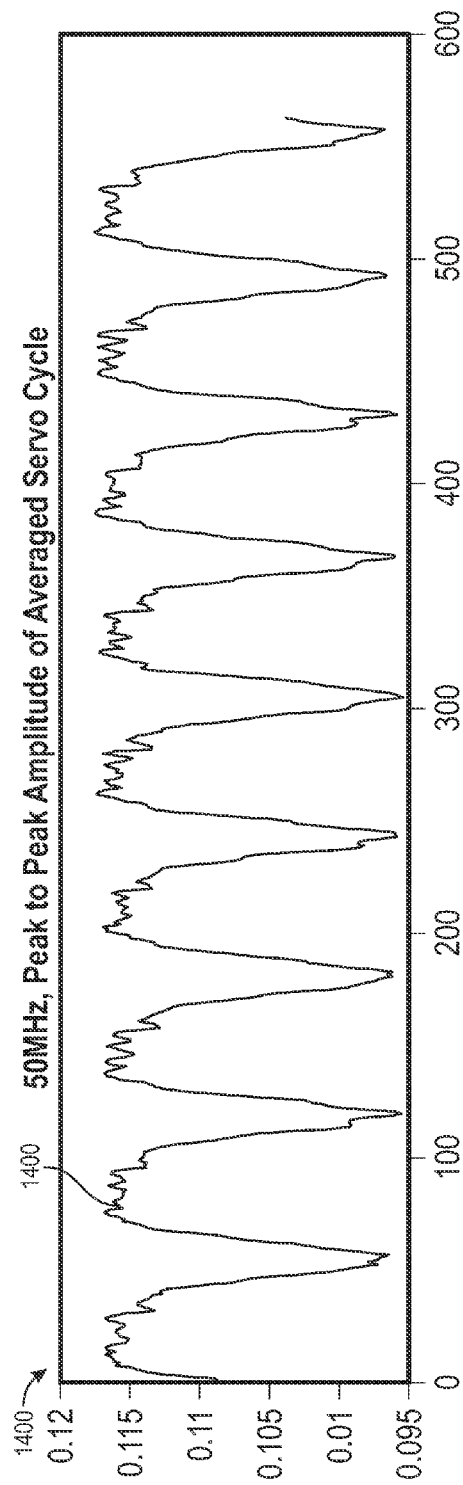
FIG. 14A shows a diagram illustrating a relationship between a sector number and a peak to peak amplitude of an averaged servo cycle.

FIG. 14A shows a diagram 1400 illustrating a relationship between a sector number and a peak to peak amplitude of an averaged servo cycle.

Figure 14B:
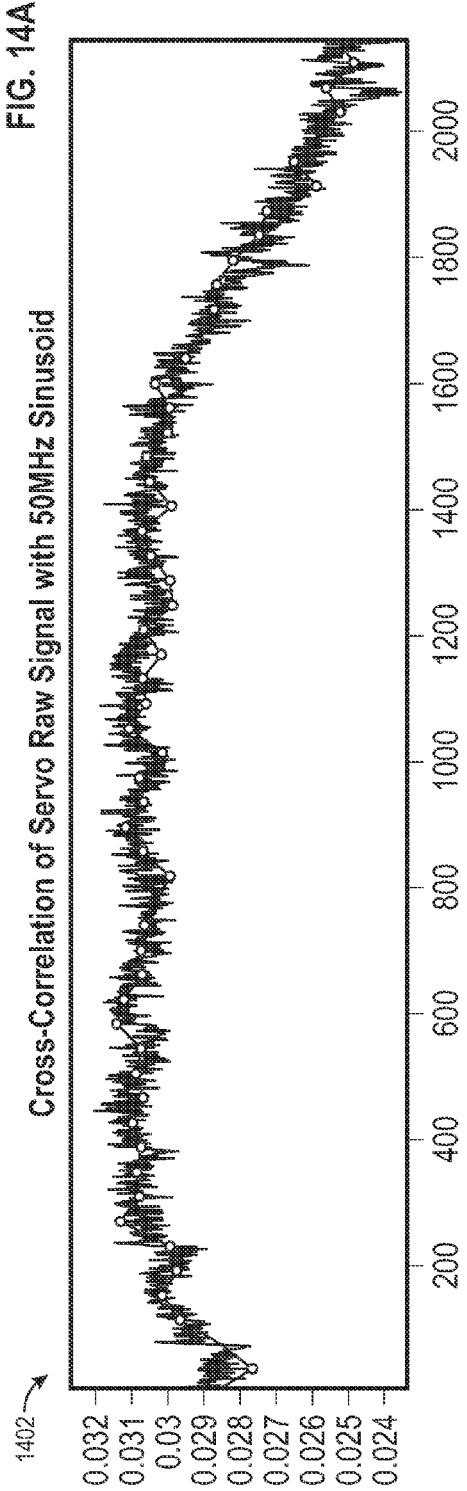

FIG. 14B shows a diagram 1402 illustrating a cross-correlation of a servo raw signal with a 50 MHz sinusoid.

In the following, use of AGC to normalize amplitude variation will be described, for example using a dual layer AGC (OD).

Figure 15A:
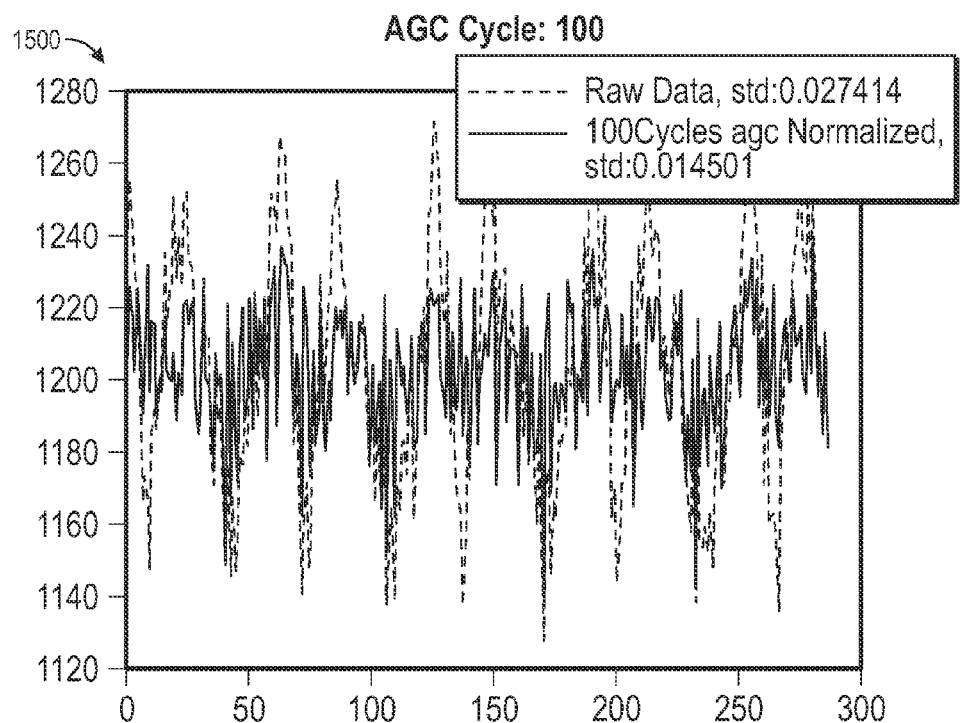
FIG. 15A shows a diagram illustrating raw data and 100 cycles AGC normalized data.
Figure 15B:
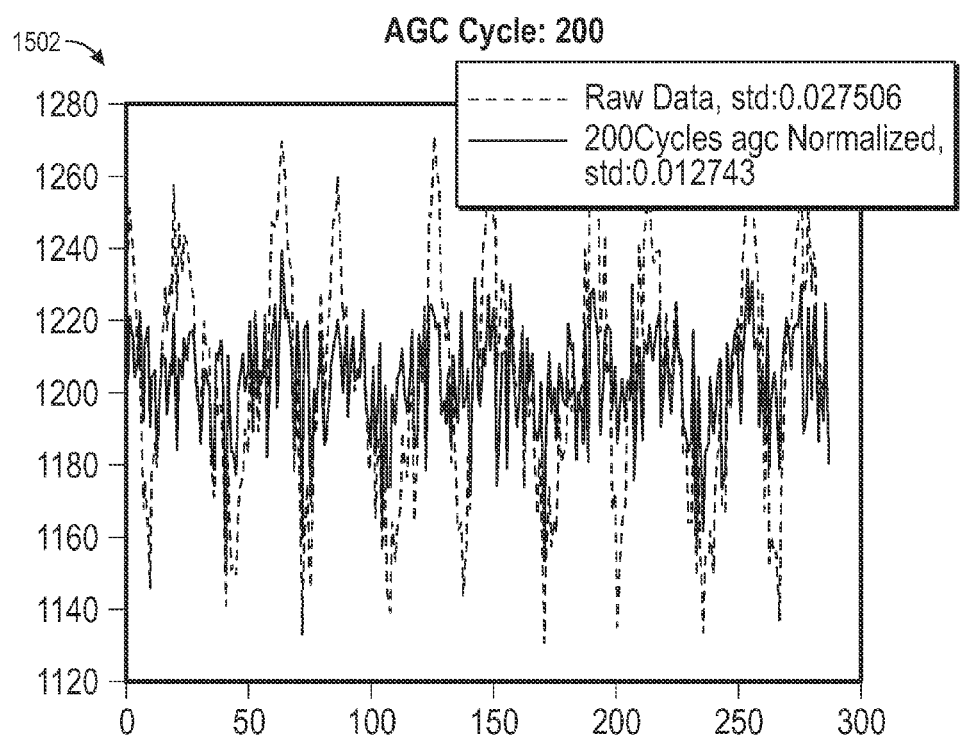
FIG. 15B shows a diagram illustrating raw data and 200 cycles AGC normalized data.
Figure 15C:
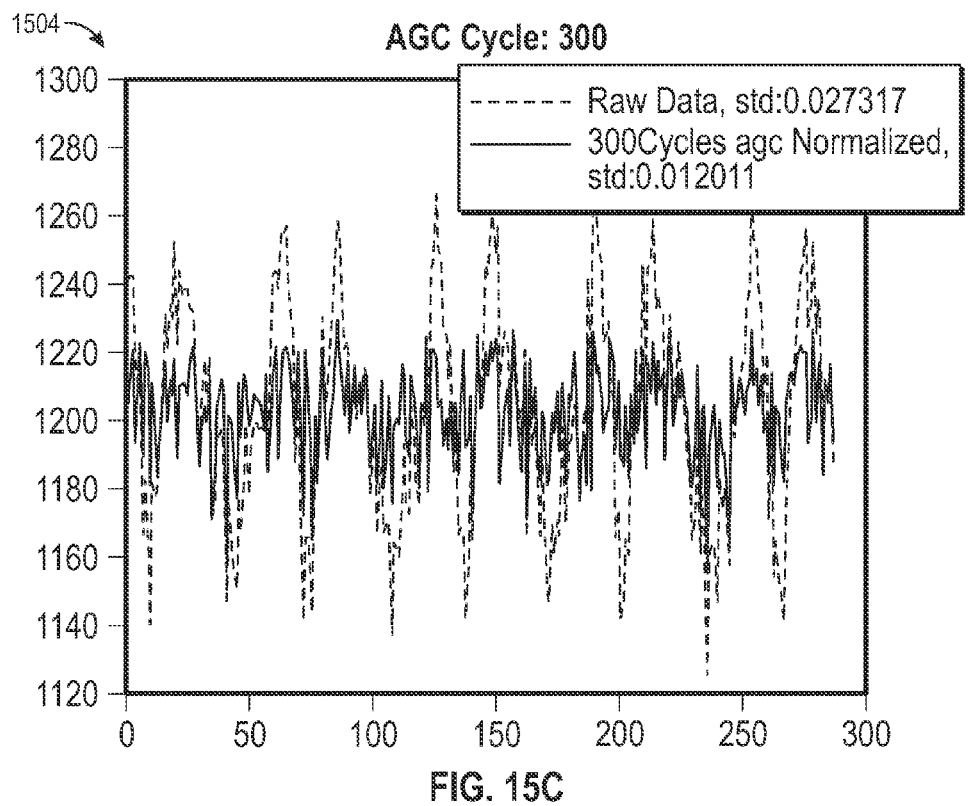
FIG. 15C shows a diagram illustrating raw data and 300 cycles AGC normalized data.
Figure 15D:
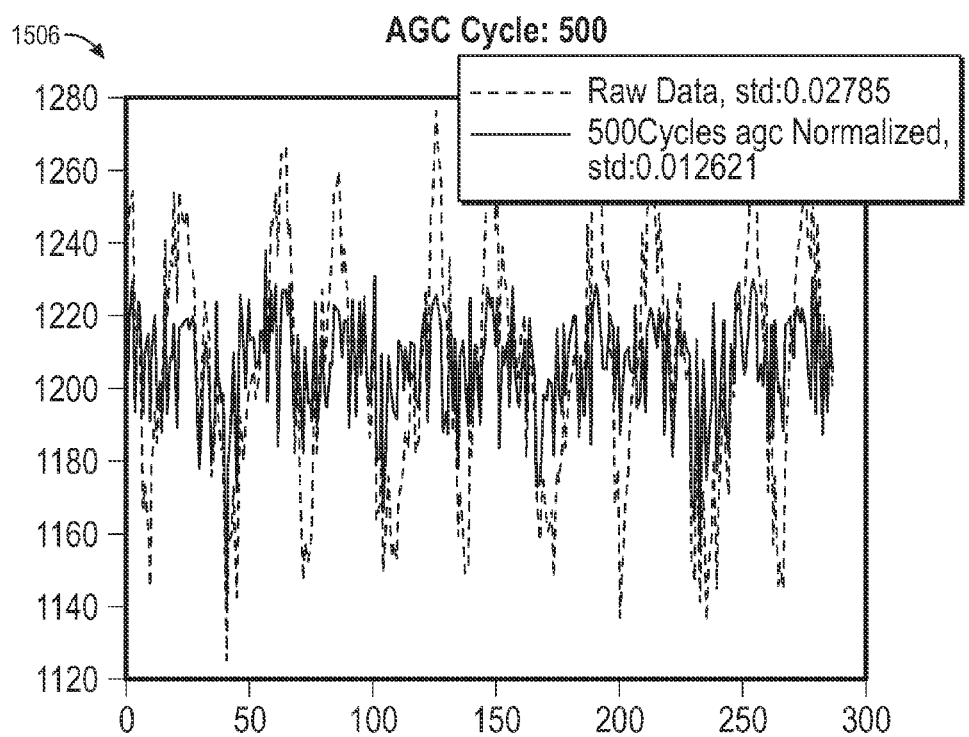
FIG. 15D shows a diagram illustrating raw data and 500 cycles AGC normalized data.

FIG. 15A shows a diagram 1500 illustrating raw data and 100 cycles AGC normalized data. FIG. 15B shows a diagram 1502 illustrating raw data and 200 cycles AGC normalized data. FIG. 15C shows a diagram 1504 illustrating raw data and 300 cycles AGC normalized data. FIG. 15D shows a diagram 1506 illustrating raw data and 500 cycles AGC normalized data. As can be seen from the number in the respective legends from FIG. 15A to FIG. 15D, the standard deviation (referred to as "std" in the legends) may drop due to more cycles used to do averaging.

In the following, a reduction of the interference from a fly height variation will be described. Fly height variation and disk deformation may cause variation of magnetic spacing, which in turn may cause readback amplitude variation. Amplitude variation may introduce extra noise into PES signal which may be generated based on average readback signal amplitude. To reduce such amplitude variation, AGC may be used to normalize the readback signal before PES demodulation. Experiment data shows that using 200 cycles of AGC can effectively reduce amplitude variation of Servo burst signal from ~3% to 1.2% (normalized standard deviation).

The differential servo burst according to various embodiments may reduce the RRO in the PES demodulation noise. The interference from the buried servo burst may significantly degrade the BER performance of the data channel. The differential servo bursts according to various embodiments may be used to minimize the interference of the servo signal to the data channel. The layout of the differential servo bursts may not induce the transition shift to the data magnetic transition while writing data signal, such that the frequency of servo bursts may be lower which may reduce the spacing loss and improve the quality of PES. An AGC signal may be used to normalize the signal of servo bursts, such that to minimize the effects due to the fly height modulation.

For buried servo, the phase alignment can be done at the AGC part. According to various embodiments, the digital PES demodulation with differential servo bursts according to various embodiments may be implemented. The differential servo bursts according to various embodiments may reduce the interference from the servo layer to the data channel. When on track, there may no interference from servo channel to data channel. The layout of the differential servo bursts according to various embodiments may not induce the transition shift to the data magnetic transition while writing data signal, such that the frequency of servo bursts in servo layer may be lower which can reducing the spacing loss and improve the quality of PBS. According to various embodiments, the AGC signal may be used to normalize the signal of servo bursts, such that to minimize the effects due to the fly height modulation. The differential servo bursts according to various embodiments may reduce the coupled data signal and thus may reduce the RRO of PES noise it induced. Performance analysis shows that the differential servo pattern according to various embodiments has 3 dB SNR gain over the dual-frequency servo system and the orthogonal servo system according to various embodiments.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A recording medium, comprising:
   a data layer configured to record data therein; and
   a dedicated servo layer configured to provide servo information, wherein the dedicated servo layer comprises a plurality of tracks, wherein a first track comprises a first servo signal, the first servo signal including first servo bursts of a predetermined frequency,
   wherein a second track adjacent to the first track comprises a second servo signal, the second servo signal including second servo bursts of the predetermined frequency, and
   wherein the first servo bursts are orthogonal to the second servo bursts, and wherein the data in the data layer and the servo information in the dedicated servo layer are provided in a same direction.

2. The recording medium of claim 1, wherein:
   the first servo bursts comprise a sine signal; and
   the second servo bursts comprise a sine signal phase shifted compared to the first servo bursts.

3. The recording medium of claim 1, wherein:
   the first servo bursts comprise a sine signal; and
   the second servo bursts comprise a cosine signal.

4. The recording medium of claim 1, wherein the first servo bursts are negated to the second servo bursts.

5. The recording medium of claim 4, wherein:
   the first servo bursts comprise a sine signal; and
   the second servo bursts comprise a sine signal phase shifted compared to the first servo bursts.

6. The recording medium of claim 4, wherein:
   the first servo bursts comprise a sine signal; and
   the second servo bursts comprise a negated sine signal.

7. The recording medium of claim 1, wherein:
   the first servo signal comprises a plurality of alternately arranged preambles and servo bursts; and
   the second servo signal comprises a plurality of alternately arranged preambles and servo bursts.

8. The recording medium of claim 1, wherein the first servo signal and the second servo signal comprises information for providing positioning information.

9. A data storage device, comprising:
   a recording medium comprising
      a data layer configured to record data therein, and
      a dedicated servo layer configured to provide servo information, wherein the dedicated servo layer comprises a plurality of tracks, wherein a first track comprises a first servo signal, the first servo signal including first servo bursts of a predetermined frequency, wherein a second track adjacent to the first track comprises a second servo signal, the second servo signal including second servo bursts of the predetermined frequency, and wherein the first servo bursts are orthogonal to the second servo bursts, and wherein the data in the data layer and the servo information in the dedicated servo layer are provided in a same direction; and
   a reader head configured to read a signal from the recording medium.

10. The data storage device of claim 9, further comprising:
    a position error signal determination circuit configured to determine a position error signal based on the signal read from the recording medium.

11. The data storage device of claim 10, wherein the position error signal determination circuit is configured to determine the position error signal based on an average of the signal read from the recording medium over a plurality of servo cycles.

12. The data storage device of claim 10, wherein the position error signal determination circuit is configured to determine the position error signal based on multiplying the signal read from the recording medium with a waveform of the predetermined frequency.

13. A method for determining a position error signal in a recording medium, the recording medium comprising: a data layer configured to record data therein, a dedicated servo layer configured to provide servo information, wherein the dedicated servo layer comprises a plurality of tracks, wherein a first track comprises a first servo signal, the first servo signal including first servo bursts of a predetermined frequency, and wherein a second track adjacent to the first track comprises a second servo signal, the second servo signal including second servo bursts of the predetermined frequency, the method comprising:
    reading a signal from the first servo bursts and/or the second servo bursts of the recording medium; and
    determining a position error signal based on the read signal,
    wherein the first servo bursts are orthogonal to the second servo bursts, and wherein the data in the data layer and the servo information in the dedicated servo layer are provided in a same direction.

14. The method of claim 13, wherein the position error signal is determined based on an average of the read signal over a plurality of servo cycles.

15. The method of claim 14, wherein the position error signal is determined based on multiplying the read signal with a waveform of the predetermined frequency.

16. The method of claim 13, wherein the first servo bursts are orthogonal to the second servo bursts.

17. The method of claim 13, wherein the first servo bursts are negated to the second servo bursts.

* * * * *